United States Patent [19]

Laeng et al.

[11] 4,106,082

[45] Aug. 8, 1978

[54] HOODS FOR RECORD PLAYERS AND OTHER SOUND RECORDING OR REPRODUCING APPARATUS

[76] Inventors: Rudolf Laeng; Benedikt A. Strausak, Merianweg 19; Josef Vavrina, Steinhofstrasse 9, all of 3400 Burgdorf, Schweiz, Switzerland

[21] Appl. No.: 715,389

[22] Filed: Aug. 18, 1976

[30] Foreign Application Priority Data

Aug. 20, 1975 [DE] Fed. Rep. of Germany ....... 2537084

[51] Int. Cl.2 ................................................ G11B 1/04

[52] U.S. Cl. ...................................................... 362/87

[58] Field of Search ...................... 240/2 L, 2 R, 2.12, 240/52.2, 2 SL

[56] References Cited

U.S. PATENT DOCUMENTS

| | | | |
|---|---|---|---|
| 1,189,592 | 7/1916 | Lutz | 240/2.12 |
| 1,224,215 | 5/1917 | Scalbom | 240/2.12 |
| 1,236,248 | 8/1917 | Atkinson | 240/2.12 |
| 1,855,942 | 4/1932 | Dalton | 240/2.12 |
| 1,933,965 | 11/1933 | Carlson | 240/52.2 |
| 2,173,223 | 9/1939 | Belar | 240/2.12 |

FOREIGN PATENT DOCUMENTS

| | | | |
|---|---|---|---|
| 2,405,387 | 8/1975 | Fed. Rep. of Germany | 240/2 L |

*Primary Examiner*—Richard L. Moses

*Attorney, Agent, or Firm*—Albert L. Jeffers; John F. Hoffman

[57] ABSTRACT

A covering hood for a record player or the like having a stroboscopic lamp mounted on the inside thereof and including a tilt actuated switch for activating the lamp upon raising the hood. The connecting lead for the lamp is disposed within an elongated cable channel secured to or integral with the hood. If desired, the lamp may be supported by means of a gooseneck having a suction cup on one end adapted to grip the surface of the hood.

2 Claims, 4 Drawing Figures

HOODS FOR RECORD PLAYERS AND OTHER SOUND RECORDING OR REPRODUCING APPARATUS

The invention relates to hoods for record players and other sound recording or reproducing apparatus.

Apparatus for sound recording or reproducing, namely, record players, are frequently placed in dark corners of a room which renders their operation difficult. The invention is therefore based on the problem of suggesting an article for sound reproducing or reproduction which can be easily operated. For the solution of this problem, the invention is characterized in that on the inside of a covering hood a component containing a lamp with a switch is fixed. The lamp illuminates the underside of the covering hood so that the apparatus, in particular a record player or even a sound recording apparatus, is sufficiently illuminated for operation. Due to the design, the covering hood according to the present invention can be fitted for existing apparatus. It is important that no connections between the covering hood and the actual housing of the apparatus are present so that the component can be easily exchanged and mounted. The covering hood can also be hinged upwards or removed without trouble without the functioning of the component being adversely affected.

It is preferred that the switch be a tilt actuated switch. This tilt actuated switch is, for example, so adjusted that upon tilting of the covering hood, the lamp will be automatically switched on. In an alternative embodiment, the lamp is switched on and off by rotating a housing part of the component to which the tilting switch is connected.

Furthermore, it is preferred that the lamp be a stroboscopic lamp so that the correct speed of rotation of the record player can be regulated at the same time if the component is fitted thereto.

Furthermore, it is preferred that the connecting lead for the lamp be guided in a tube open along one side and fixed on the surface of the lid or molded therein. Thus, at the same time, the rigidity of the lid surface is increased and in an easy manner a space between the lamp and the underside of the lid space can be maintained which serves for cooling the lamp.

In another embodiment, the component is fixed on a gooseneck which in turn is provided with a suction cup. This embodiment is characterized by ease of assembly whereby the component, by means of the gooseneck, can easily be brought into the optimum position.

The invention will be described with reference to the accompanying drawings of the embodiments wherein.

Figure 1:
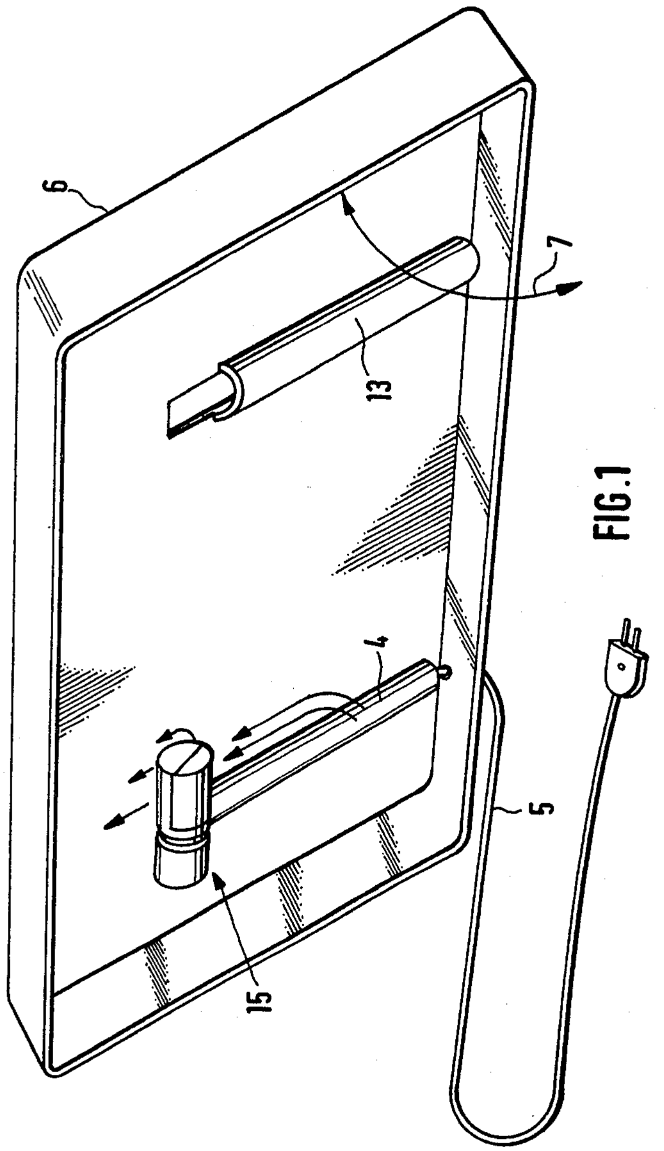
FIG. 1 is a perspective view of a covering hood according to the invention.
Figure 3:
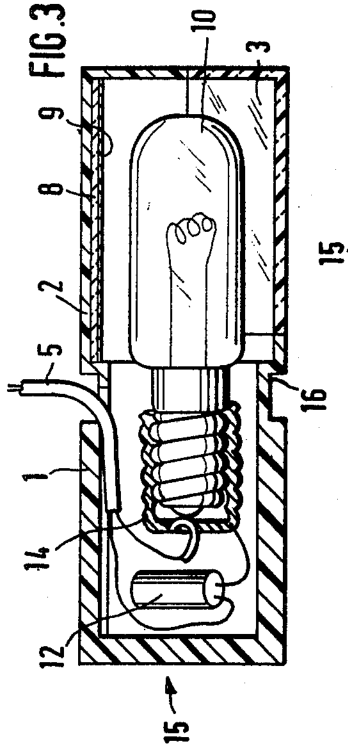
FIG. 3 is a longitudinal section through the lamp and switch assembly shown in FIG. 3.

In FIG. 1, a covering hood 6 is shown which pivots upward from the horizontal through an angle 7. On the underside of the lid surface of the covering hood 6 is located a component indicated in its entirety by reference numeral 15 and which is shown in more detail in FIG. 3. This component contains as essential elements a lamp 10 and an inclination sensitive switch 12 which, in the embodiment illustrated, is shown as a mercury switch. Lamp 10 may be a stroboscopic lamp so that the speed of rotation of the record player may be regulated.

A connecting lead 5 of the component is guided in a cable channel 4. Between the underside of the lid of the covering hood 6 and the upper side of the component 15 a distance $x$ is maintained which serves for the cooling of the lamp.

Figure 2:
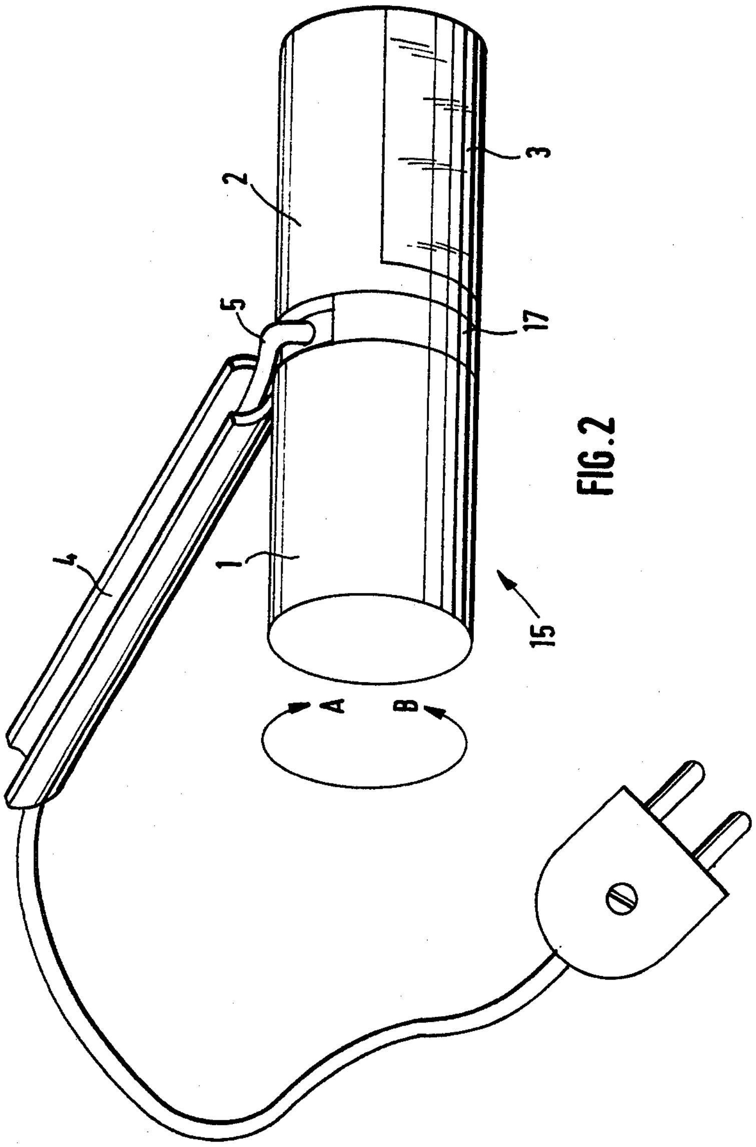
FIG. 2 is an enlarged perspective view of one embodiment of the lamp and switch assembly and cable lead.
Figure 4:
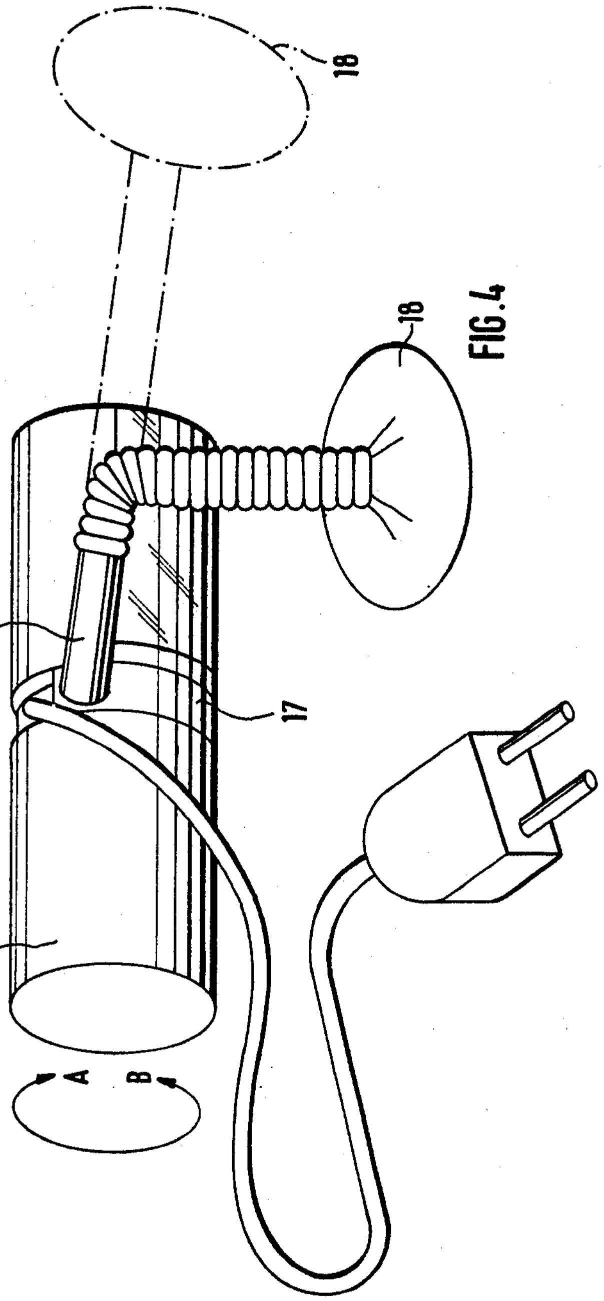
FIG. 4 is a perspective view of another embodiment of the invention.

The tilting switch 12 is either so adjusted that the lamp, upon raising the covering hood as in FIG. 1 or upon rotation of the inclination sensitive switch or the housing 1 of the unit 15 in the direction of the arrow A–B (see FIGS. 2 and 4), the lamp is switched on.

According to FIG. 1, the component 15 is located approximately in the middle above the axis of rotation of the record placed thereon. Symmetrically with the cable channel 4 in FIG. 1, there may be fixed a further cable channel 13 which likewise serves for reinforcing the lid.

The component 15 comprises a housing which carries the tilting switch 12 and the lamp socket 14. In addition, the connecting cable 5 on the housing 1 is guided outwardly. The lamp 10 is screwed into the socket 14.

Furthermore, the component 15 has a shield 2 for the lamp above which a heat insultation layer 8 is mounted. Over this there is located an optical reflector 9. A transparent or translucent lamp shade 3 is located on the underside.

Between the housing 1 and the shield 3 there is provided an annular groove 16 which may carry a mounting ring 17 for holding the lamp. Housing 1 is rotatably received in mounting ring 17, which partially encircles housing 1, so as to be rotatable with respect to lid 6. When housing 1 is rotated relative to ring 17, the tilt activated switch will be actuated. This is used in particular in the embodiment according to FIG. 4 where there is fixed on the mounting ring 17 a gooseneck 11 pivotable in all directions. On the free end of the gooseneck 11 is located a suction cup 18. Instead of the suction cup, the gooseneck, and thus the component 15, may also be connected so as to be easily detachable in any other way, for example by screws.

It is important that no connection exist between the covering housing which carries the component 15 and the remaining housing of the article so that the covering hood can be raised or removed completely as required.

What we claim is:

1. A hood for record players comprising in combination:
   - a lid having an inside surface,
   - a flexible gooseneck secured at one end to said lid inside surface,
   - a stroboscopic lamp comprising a housing and a mounting ring at least partially encircling said housing, said ring being secured to the other end of said gooseneck,
   - a slit tube fixedly connected to said lid inside surface,
   - said lamp including a connecting lead disposed within said slit tube,
   - said lamp housing being rotatably received in said mounting ring so as to be rotatable with respect to said lid, and
   - tilt actuated switch means mounted within said housing and arranged so as to be actuated when said lid is raised and alternatively to be actuated when said lamp housing is rotated relative to said ring.

2. The hood of claim 1 wherein said one end of said gooseneck is attached to said lid inside surface by means of a suction cup.

* * * * *